United States Patent
Budelsky et al.

(10) Patent No.: US 7,518,762 B2
(45) Date of Patent: Apr. 14, 2009

(54) ILLUMINATED MEDIA POSITION INDICATOR AND METHOD OF USE

(75) Inventors: Stephen A. Budelsky, Lexington, KY (US); Mahesan Chelvayohan, Lexington, KY (US); Walter K. Cousins, Lexington, KY (US); Charles J. Simpson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1008 days.

(21) Appl. No.: 11/026,368

(22) Filed: Dec. 30, 2004

(65) Prior Publication Data
US 2006/0146380 A1 Jul. 6, 2006

(51) Int. Cl.
*H04N 1/04* (2006.01)

(52) U.S. Cl. .................. 358/474; 358/475; 358/488

(58) Field of Classification Search ............... 358/474, 358/475, 481, 488, 480, 496, 497, 509; 235/462.33; 250/363.02; 359/17, 202; 378/146; 382/131; 396/639

See application file for complete search history.

(56) References Cited

U.S. PATENT DOCUMENTS

| | | | |
|---|---|---|---|
| 4,260,248 A | 4/1981 | Murata et al. | |
| 4,597,663 A | 7/1986 | Yoshiura et al. | |
| 4,666,289 A | 5/1987 | Kawano | |
| 4,696,563 A | 9/1987 | Shibusawa | |
| 4,974,022 A * | 11/1990 | Nezu | 399/196 |
| 5,710,967 A | 1/1998 | Motoyama | |
| 2003/0038227 A1* | 2/2003 | Sesek et al. | 250/208.1 |
| 2004/0161273 A1 | 8/2004 | Anderson et al. | |
| 2005/0135840 A1* | 6/2005 | Sakurai et al. | 399/211 |
| 2006/0109199 A1* | 5/2006 | Yee et al. | 345/1.3 |

FOREIGN PATENT DOCUMENTS

| | | |
|---|---|---|
| JP | 58126549 A | 7/1983 |
| JP | 59189335 A | 10/1984 |
| JP | 1040853 A | 2/1989 |
| JP | 3221936 A | 9/1991 |

* cited by examiner

*Primary Examiner*—Jerome Grant, II
(74) *Attorney, Agent, or Firm*—Middleton & Reutlinger

(57) ABSTRACT

An illuminated media position indicator for an imaging device comprises a scanner having a scanner top cover including an inner edge portion which defines an opening for a scanning platen disposed adjacent the opening. The inner edge portion defines at least one corner corresponding to a scan origin. An illuminated registration corner is positioned in said at least one corner corresponding to the scan origin and comprises at least one LED in optical communication with the illuminated registration corner. The illuminated registration corner communicates light from the at least one LED throughout the illuminated registration corner using substantially total internal reflection to indicate media position and orientation at said scan origin.

29 Claims, 6 Drawing Sheets

ILLUMINATED MEDIA POSITION INDICATOR AND METHOD OF USE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTINGS, ETC.

None.

BACKGROUND

1. Field of the Invention

The present invention provides an apparatus and method for illuminating a registration or origin corner as well as providing an orientation indication for placement of media on a flatbed scanner. More specifically, the present invention provides an illuminated registration corner on a flatbed scanner which indicates both the orientation of the media being scanned and the location for placement of the media.

2. Description of the Related Art

Scanners are used to scan a target image from target media and create scanned image data which can be displayed on a computer monitor, which can be used by a computer program, which can be printed, which can be faxed, etc. Scanned image data may be saved to memory or a magnetic or optical drive, or other fixed or removable memory device. Scanning devices may be packaged in a stand-alone housing or as part of a multi-function peripheral, including a printing component to perform scanning as well as standard copying functions.

Scanners typically include a housing aperture defined by an edge wherein a platen is located. Target media is positioned on the platen for scanning of the target image, which may comprise text, image, or both, by a scanbar. Depending on the positioning of the scanbar relative to the platen, the platen can be transparent where the scanbar is beneath the platen or can be solid where the scanbar is above the platen. For a typical flatbed scanner, the scanbar will be below the platen, which will have a transparent section to allow for the scan operation.

In a conventional flatbed scanning operation a user must position the target media on the platen at a registration corner and further must properly orient the target media within that registration corner. Such positioning and orientation is particularly important when the target media is a photograph, such as a 4"×6" photograph, and a subsequent reproduction photograph is being formed, for example, by a printing component of a multi-function peripheral device. Users often have difficulty determining where to position the photograph and further which direction to orient the photograph in the registration corner, both of which are essential to proper reproduction of the photograph.

Improper alignment of the target media can result in an improper scan which requires the user to replace the target media in a proper location or orientation, or both, and re-scan the target media. This is time consuming and wastes resources, both of which are undesirable.

Various solutions have attempted to correct problems of improper positioning and orientation. One solution has been to locate reference marks along the scanner top cover adjacent the platen. Such reference marks may be molded or screen printed on the scanner top cover along the edge of the platen and may indicate a plurality of media sizes, for example 8½"×11", A4, A6, legal size, etc. and further indicate the appropriate orientation of the target media being placed on the platen. However, when molded, such reference marks are often the same color as the surrounding plastic and therefore are difficult to perceive and distinguish from the adjacent material. Further, when such marks are screen printed, they tend to wear off with use and therefore become either very light or absent from the scanner top cover. In another attempted improvement, the reference marks have been molded and screen printed, however, the screen printing often wears leaving the problem of the molded reference mark alone, as mentioned previously. In yet a further attempt to improve the use of flatbed scanners and copiers, light emitting diodes (LEDs) have been disposed beneath the scanner top cover causing illumination of the reference marks below. However, due to the use of numerous reference marks for various page sizes, numerous LEDs have been utilized which is costly to a manufacturer and ultimately to the consumer. In short, this is not a cost effective solution.

Alternate solutions include the use of flashing lights on a control panel to indicate to a user that a target media is improperly positioned or oriented. However, such an implementation requires that a user memorize flashing patterns and corresponding error codes or always maintain a user manual at the scanner or copier. Such solution is also not effective and therefore alternative corrective measures are required to ease use and indicate to a user the proper position and orientation of a target media being scanned.

Given the foregoing, it will be appreciated that an apparatus is required which overcomes the aforementioned difficulties and deficiencies.

SUMMARY OF THE INVENTION

An illuminated media position indicator for an imaging device comprises a scanner having a scanner top cover including an inner edge portion which defines an opening for a scanning platen disposed adjacent the opening. The inner edge portion defines at least one corner corresponding to a scan origin. An illuminated registration corner positioned in at least one corner corresponding to the scan origin comprises at least one LED in optical communication with the illuminated registration corner. The illuminated registration corner using substantially total internal reflection for communicating light from the at least one LED throughout the illuminated registration corner to indicate media position and orientation at said scan origin.

The illuminated registration corner further comprises a first light bar and a second light bar and partially defines an inner edge portion of the scanner top cover. The first and second light bars are in a substantially L-shaped arrangement wherein, in one form, one of the first light bar and the second light bar is shorter than the other of the first light bar and the second light bar. At least one light pipe is in optical communication with the at least one LED and the illuminated registration corner. The at least one light pipe comprises a first light pipe and a second light pipe which utilize internal reflection to pipe or communicate light from the at least one LED to the illuminated registration corner. The at least one LED is deactivated during a scanning operation.

The illuminated registration corner further comprises a plurality of spaced apart prismatic surfaces extending from a lower surface of the illuminated registration corner. The plurality of prismatic surfaces interrupt a light path within the illuminated registration corner and direct a portion of the light path upward through the illuminated registration corner.

A method of using an illuminated registration corner comprises the steps of illuminating a registration corner during start-up of a peripheral device comprising a flatbed scanner; deactivating the illuminated registration corner a predetermined period of time before a scanning operation starts; reactivating the illuminated registration corner when the scanning operation is finished.

The method further comprises the step of activating and deactivating the illuminated registration corner with a processor. The method further comprises the step of piping light from a light emitting diode through the illuminated registration corner. The method further comprises the step of bending light from a light emitting diode into longitudinal alignment with at least one light bar. The method further comprises the step of utilizing total internal reflection to pipe light from a light emitting diode to the illuminated registration corner.

DETAILED DESCRIPTION

Referring now in details to the drawings, wherein like numerals indicate like elements throughout the several views, there are shown in FIGS. 1-7 various aspects of an illuminated registration corner for a flatbed scanner. The device generally provides two functions. According to a first function, the illuminated registration corner indicates to a user a proper location for placement of a target media on a flatbed scanner. According to a second function, the illuminated registration corner indicates to a user the proper orientation of the target media on the flatbed scanner. Further, it should be understood by one of ordinary skill in the art upon reading of this description that the device taught herein may be utilized on a stand alone flatbed scanner or with a flatbed scanner incorporated into a multi-function peripheral device.

Figure 1:
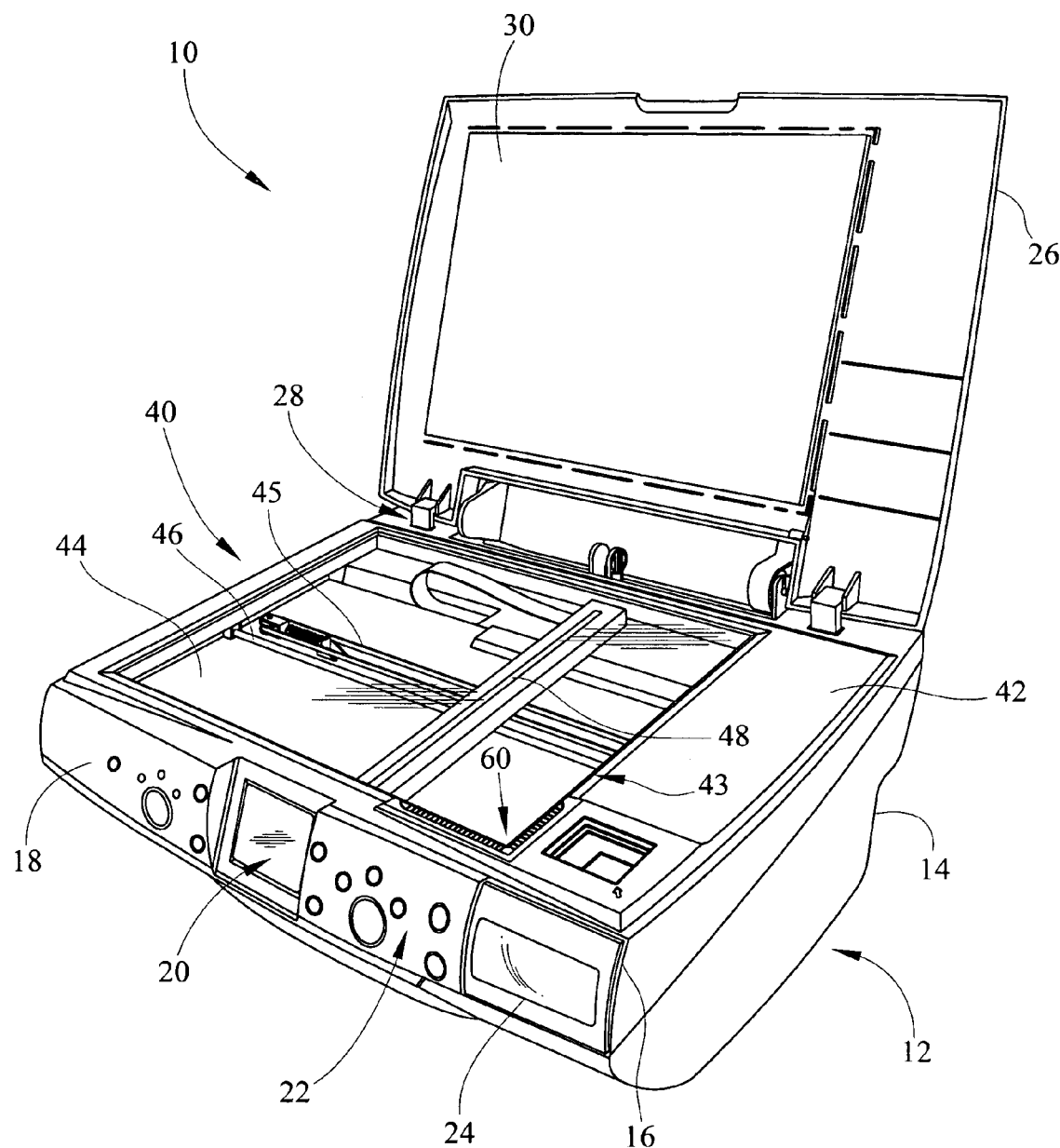
FIG. 1 is a perspective view of a multi-function peripheral device including a flat bed scanner and an illuminated registration corner.

Referring initially to FIG. 1, a multi-function peripheral device 10 is shown comprising at least a printer (not shown) and a flat bed scanner 40. The printer can comprise a laser printer, an ink-jet printer, a dye-sublimation printer, or the like. The printer and flat bed scanner 40 can be utilized in combination to provide copies of target media, which may include either, or both, text and images. Alternatively, the flat bed scanner 40 can be utilized separately to scan target media and produce scanned image data which can be manipulated by a personal computer or, in a limited fashion, by the multi-function peripheral 10. The printer can also be separately used to print documents, drawings, or photos from data provided from, for instance, a personal computer or network computer, storage device or other peripheral. Although the printer is not specifically shown, components defining the printer are disposed within a housing 12 generally beneath the components defining the scanner 40.

The multi-function peripheral device 10 comprises a housing 12 defined by a lower housing or base portion 14 and an upper housing 16. The printer is generally located within the lower housing 14 and the flatbed scanner 40 is generally located in the upper housing 16. Hingedly connected to the housing 12 is a scanner lid 26. The scanner lid 26 is connected by hinge 28 to the upper housing 16 along a rear edge of the multi-function peripheral 10. According to one embodiment, the hinge 28 can comprise a biasing device, such as a torsion spring, fluid-power cylinder or other device to bias the scanner lid 26 toward either or both closed or opened positions. Alternatively, the scanner lid 26 is not biased but is merely pivoted by manual application of force and gravity. The scanner lid 26 is substantially rectangular in shape and generally covers the scanner 40 during operation. In addition, the scanner lid 26 also protects the scanner 40 from damage when the multi-function device 10 is not being used. The scanner lid 26 further comprises a background material 30 on a lower surface which is of a known color and therefore recognizable by a scanbar 48 positioned within the flatbed scanner 40.

According to the depicted embodiment, the flatbed scanner 40 is partially disposed within by the upper housing 16 and a scanner top cover 42. Although the upper housing 16 and scanner top cover 42 are denoted as separate parts, it should be understood that these alternatively can be integrally formed or the same part. The scanner top cover 42 extends above the upper housing 16 and comprises an inner edge portion 43 which in the exemplary embodiment has a substantially vertical surface and a tapered surface positioned on an upper surface of the platen 44. The inner edge portion 43 of the scanner top cover 42 is substantially rectangular in shape formed by two pairs of parallel sides and four right angles. The inner edge portion 43 also comprises a L-shaped opening adjacent a scan origin wherein an illuminated registration corner 60 is located. The perimeter of the inner edge portion 43 defines an opening wherein the platen 44 is positioned. The platen 44 is also substantially rectangular in shape with outer dimensions larger than the dimensions of the inner edge portion 43 so that the inner edge portion 43 rests on the platen 44. The platen 44 can be formed of glass, PLEXIGLASS® or other transmissive material. Beneath the platen 44 is a scanbar track 46 generally extending between two parallel sides of the upper housing 16. The scanbar track 46 extends across the opening defined by the inner edge portion 43 in a scanning direction. For purpose of this description the scanning direction is the direction of movement of a scanbar 48 slideably positioned on the scanbar track 46. The scanbar 48 extends across the opening defined by the inner edge portion 43 and moves in the scanning direction along the scanbar track 46 in order to scan target media located on the platen 44. Alternatively, the scanbar track 46 can extend in a direction normal to that shown in FIG. 1 in which case the scanbar 48 is also positioned in a direction normal to the position shown in FIG. 1.

The scanbar 48 can be driven by a scan drive assembly 45 which can include, but is not limited to, a motor, a pulley and belt drive system, a gear drive, a screw-drive mechanism, or guide wires located within or adjacent to the scanbar track 46. The scan drive assembly 45 drives the scanbar 48 in the scanning direction back and forth along the scanbar track 46 from a home position adjacent or beneath the illuminated registration corner 60. When not in use or waiting for a scan command, the scanbar 48 is moved to the home position beneath or adjacent to one of the sides defining the inner edge 43 of the scanner top cover 42. The scanbar or scan carriage 48 is depicted within the scanner 40 and operates by a plurality of parts which are not shown but generally described herein. The scanbar 48 may comprise either an optical reduction type scanner, commonly known as a charge-coupled device (CCD) scanner, or a contact image sensor (CIS) type. The optical reduction scanner type uses an optical reduction system comprising lenses, mirrors, lamp and an image sensor array. The image sensor array comprises a collection of tiny, light-sensitive elements, which convert photons into electrons. These light sensitive elements are called photosites—the brighter the light that hits a single photosite, the greater the electrical charge that will accumulate at that site. The mirrors, filters and lenses located within the scanbar 48 direct the light reflected from the target document to the image sensor array within the scanbar 48. The exact configuration of these components will depend on the model of scanner. For color scanning red, green and blue images are made of the target document using either a three pass method or a single pass method as is known in the art. The scanner software assembles the data from the scanned images into a single full-color image.

In general, for inexpensive flatbed scanners contact image sensors (CIS) are used in the scanbar 48. In a CIS scanbar, the optical reduction system is replaced with a rod lens array, an image sensor array, and an illumination system using LED's. The image sensor array typically consists of 600, 1200, 2400 or 4800 photodetectors per inch (depending on resolution), spans the width of the scan area, and is placed very close to the platen 44 upon which rests the document or image to be scanned. Scanning is performed by lighting the target area of the original document with the illumination system. The light reflected from the original document is then transferred through the rod lens array and is captured by the image sensor array. The CIS scanner utilizes at least one LED, and preferably a plurality of LEDs comprising red, green and blue types to illuminate the original document.

Regardless of whether the scanbar is an optical reduction type scanner or a contact image senor (CIS), the scanbar then scans the image and sends the scanned data to a processor for processing. The processor then sends data representing the image to onboard memory, a network drive, or a PC or server housing, a hard disk drive or an optical disk drive such as a CD-R, CD-RW, or DVD-R/RW, or other memory device. Alternatively, the target or original document can be scanned by the optical scanning component and a copy printed from the printer portion in the case of the multi-function peripheral device 10.

Along the front surface of the multi-function peripheral device 10 is a control panel 18 which provides a plurality of control means. Specifically, the device comprises a graphics display 20 for displaying scanned image data, print data, or fax data or indicating selections and menus for a user to control the multi-function peripheral device 10. Further, the control panel 18 comprises a plurality of control buttons 22 for manipulating data viewed on the graphical display 20. Also located on the control panel 18 is a media center 24 which allows at least one removable storage device (not shown) to be inserted for printing images stored on the removable storage device or saving scanned image data to the removable storage device.

Figure 2:
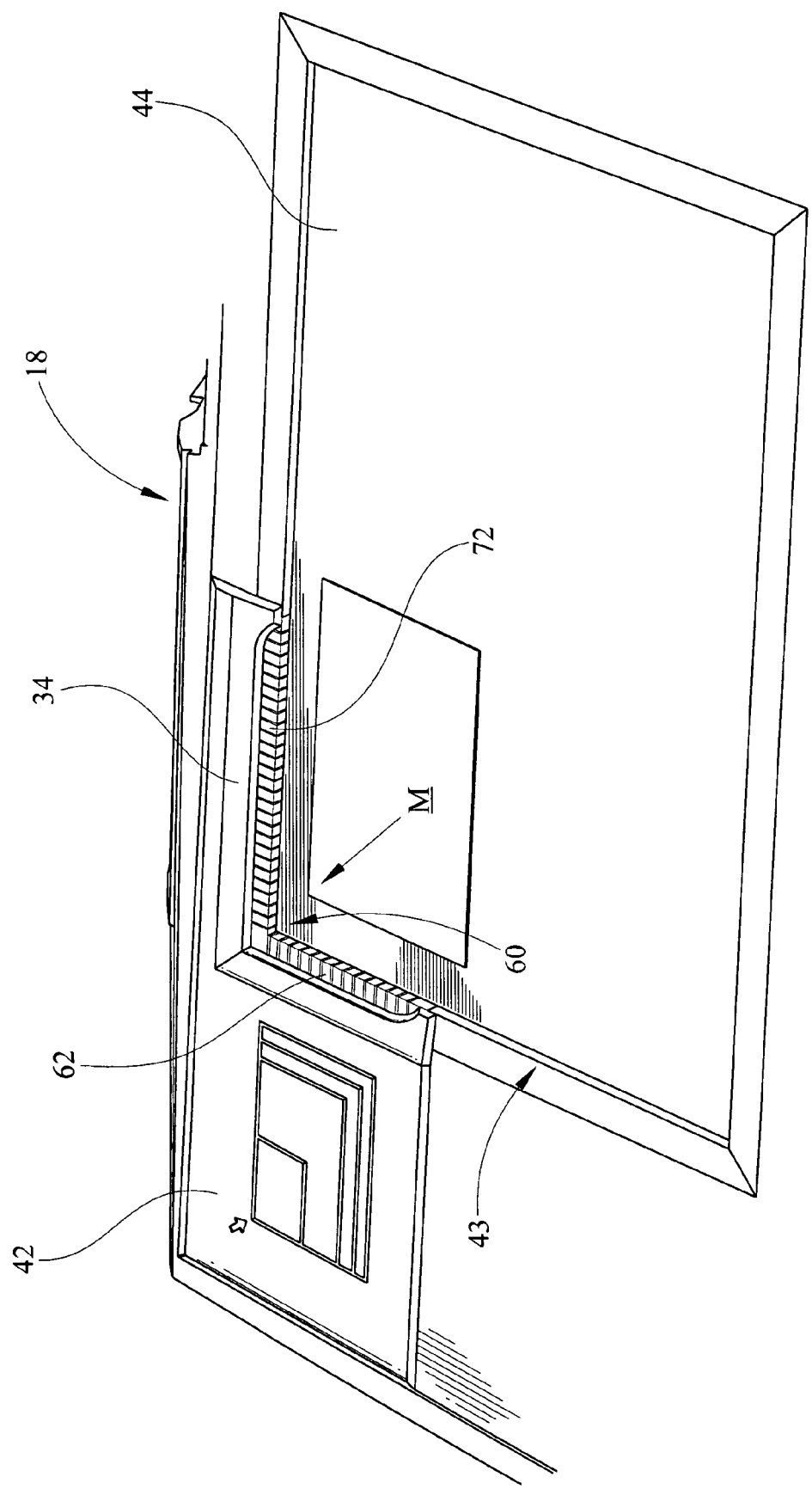
FIG. 2 is a upper perspective view of the registration corner of FIG. 1.

Referring now to FIG. 2, a close up perspective view of the illuminated registration corner 60 is depicted along with the inner edge portion 43 of the scanner top cover 42. Further, a target media M, for example a 4"×6" photograph, is depicted being moved along the platen 44 toward the illuminated registration corner 60. Extending upwardly from the scanner top cover 42 adjacent the illuminated registration corner 60 is an L-shaped trim piece 34 having first and second legs disposed above the illuminated registration corner 60. Each leg of the trim piece 34 has a length which is substantially equivalent to a corresponding first light bar 62 and second light bar 72 of the illuminated registration corner 60. The L-shaped trim piece 34 does not entirely cover the illuminated registration corner 60, but instead covers only a portion of the illuminated registration corner 60. This prevents damage from repeated contact with the scanner lid 26 when the scanner lid 26 is closed and prevents tampering with the illuminated registration corner 60. Further, the L-shaped trim piece 34 only covers a portion of the illuminated registration corner 60 so that a user can see the illumination.

As previously indicated, beneath the L-shaped trim piece 34 is the illuminated registration corner 60 which is defined by the first light bar 62 and the second light bar 72. As shown in FIG. 2, the first light bar 62 is shorter than the second light bar 72. The first and second light bars 62, 72 and the inner edge portion 43 rest on the platen 44 thereby defining the registration corner of the flatbed scanner 40. When a user positions a 4"×6" photograph on the platen 44 for scanning, the corner 60 illuminates indicating to a user the position for the photograph or target media M on the platen 44. Further, the shorter first light bar 62 corresponds to the short side of the photograph or target media and the longer second light bar 72 corresponds to the long side of the photograph or target media. Thus, the illuminated registration corner 60 also indicates the proper orientation of the target media M at the appropriate position on the platen 44. In the described configuration, the user is prompted to place the target media M in a portrait orientation, however if the position of the shorter first light bar 62 and longer second light bar 72 were reversed, the user would then be prompted to place the target media M in a landscape orientation.

Figure 3:
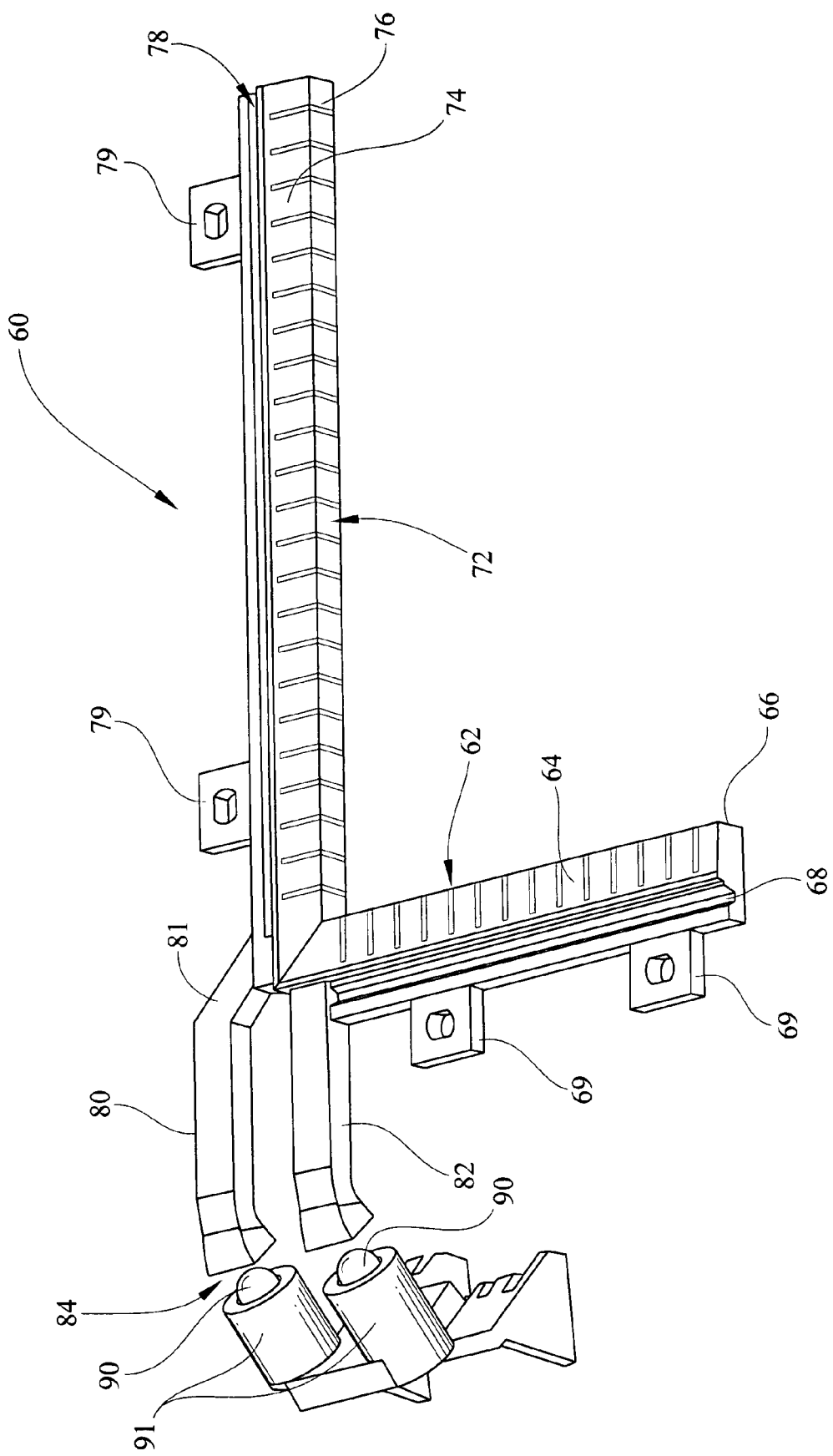
FIG. 3 is an upper perspective view of the illuminated registration corner of FIG. 1 removed from the surrounding structure of the multi-function peripheral.

Referring now to FIG. 3, the illuminated-registration corner 60 is shown removed from the multi-function peripheral 10. The shorter first light bar 62 comprises a slightly tapered upper surface 64 and an adjacent vertical surface 66 which both abut and align with corresponding surfaces of the inner edge portion 43. The vertical surface 66 extends upwardly from the platen 44 (FIG. 1) while the tapered upper surface 64 is disposed above the platen 44 and extends from the upper edge of the vertical surface 66 away from the platen 44. The upper surface 64 is slightly tapered to match the taper of the scanner top cover inner edge portion 43 shown in FIGS. 1 and 2. Alternatively, the upper surface 64 may be horizontal if the upper surface of the inner edge portion 43 of the scanner top cover 42 is also horizontal. The vertical surface 66 has a height which is substantially equivalent to the height of the vertical surface of the inner edge portion 43 (FIG. 2) of the scanner top cover 42 in order to also provide an aesthetically pleasing fit and finish between the inner edge portion 43 of the scanner top cover 42 and the illuminated registration corner 60. Thus, it should be understood by one of ordinary skill in the art that the upper surface 64 and vertical surface 66 preferably match the upper surface and vertical surface of the inner edge portion 43 of the scanner top cover 42 to provide an aesthetically pleasing finish for the user. The vertical surface 66 also provides an abutment edge for the target media M (FIG. 2) being placed in the illuminated registration corner 60 to provide a positive feedback to a user that the target media M (FIG. 2) is aligned in the proper corner for scanning. Therefore, it is important that surface 66 is aligned with the vertical surface of the inner edge portion 43 so that the target media M does not become offset between the two surfaces when positioned for scanning.

The second longer light bar 72 also comprises a slightly tapered upper surface 74 and a vertical surface 76 which abuts the inner edge portion 43 of the scanner top cover 42. The upper surface 74 and vertical surface 76 should be aligned with the inner edge portion 43 as previously described with respect to the first light bar 62. The upper tapered surfaces 64, 74 and vertical surfaces 66, 76 are illuminated during use to indicate to the user the proper placement for the target media M (FIG. 2). Both the first light bar 62 and the second light bar 72 are formed of polymethyl methacrylate (PMMA) commercially known as PLEXIGLASS®. The PMMA has desirable optical qualities and can be polished to a highly reflective finish. As compared with glass, PMMA has desirable characteristics such as light weight, high breakage resistance, ease of fabrication. Further, it has good formability characteristics for control of light rays. Alternatively, a polycarbonate material may be utilized to form the first and second light bars 62, 72. Further, due to the glass-like clarity of PMMA a plurality of lines are indicated in FIGS. 1-3 extending normal to the longitudinal directions of the light bars 62, 72. These lines represent facets 50 along the lower surfaces of the light bars 62, 72.

Along the rear edge of the first light bar 62 is an alignment channel 68 which can receive an elongated rib depending from a lower surface of the scanner top cover 42. The longer second light bar 72 also comprises an alignment channel 78 which can also receive an elongated rib depending from the scanner top cover 42. The alignment channels 68, 78 serve to align the illuminated registration corner 60 within the corner of the scanner top cover 42 so that the illuminated registration corner 60 is properly positioned and aligned relative to the inner edge portion 43, the platen 44, and relative to the scanbar 48. Since proper alignment of the registration corner 60 is necessary in order to prevent mis-scans and misalignment of target media M relative to the platen 44 and scanbar 48 disposed beneath the platen 44, various alternative cooperating shapes can be utilized to aid with alignment.

Still referring to FIG. 3, also extending from rear edges of the first light bar 62 and second light bar 72 are respective feet 69, 79 which include apertures for receiving a post or other aligning fastener which can depend from the lower surface of the scanner top cover 42. The feet 69, 79 are substantially rectangular in shape but can comprise various alternative geometric shapes. Further, the feet 69, 79 alternatively can include a post which is aligned with an aperture in a lower surface of the scanner top cover 42. The feet 69, 79 further aid the alignment channels 68, 78 in aligning the illuminated registration corner 60 relative to the platen corner 44 so that the target media M disposed on the platen 44 is positioned properly relative to the scanbar 48. In combination, these components all work together to maintain proper alignment between the target media M and the scan bar 48 and further ensure there are no gaps or misalignment between the scanner top cover 42 and illuminated registration corner 60.

Referring again to FIG. 3, extending from the illuminated registration corner 60 near the intersection of the first light bar 62 and second light bar 72 is a first light pipe 80 and a second light pipe 82. The first light pipe 80 corresponds to the first light bar 62 and the second light pipe 82 corresponds to the second light bar 72. The first light pipe 80 and second light pipe 82 are also both made of polymethyl methacrylate (PMMA) for its desirable optical qualities. Alternatively, a polycarbonate material can be utilized to form the light pipes 80, 82. When light travels from one medium to another, some degrees of reflection back into the denser medium always occurs. However, when an angle of incidence is greater than a critical angle total internal reflection occurs meaning all light is internally reflected. The light pipes 80 and 82 function to move light by this phenomenon known as total internal reflection wherein substantially all light is reflected internally and only a negligible amount of light is lost. The angle of incidence is defined as the angle between an incident ray and the normal to a reflecting or refracting surface. The critical angle is defined as the angle of incidence at which light does not pass from one medium to another but instead travels on the boundary between two mediums.

As depicted, the first light pipe 80 is in optical communication between at least one light emitting diode (LED) 90 and the first light bar 62. The first light pipe 80 extends from the at least one LED 90 in a direction that is substantially perpendicular to the first light bar 62 of the illuminated registration corner 60. Since it is necessary that the light from the LED 90 be directed in a co-axial direction with the length of the first and second light bars 62, 72 and because of the positioning of the at least one LED 90, the emitted light must be bent from the emission direction of the at least one LED 90 through an angle of about 90 degrees toward the first light bar 62. Accordingly, the first light pipe 80 receives light from the at least one LED 90 and bends the light directing it through the first light pipe 80 and to the first light bar 62. In order to change the direction of the emitted light, the first light pipe 80 has an angled portion 81 wherein the light is bent through a first angle and then through a second angle totaling about 90 degrees in order to direct the light in a direction substantially co-axial to the longitudinal axis of the first light bar 62. The exemplary angled portion 81 comprises an entrance angle and an exit angle in order to bend the light through about 90 degrees. However, the first and second angles of the angled portion 81 must be shallow enough that the total internal reflection is not lost. Alternatively, more than two angles can be utilized to move through the 90 degrees bend or through some other angle which may vary due to the positions of the at least one LED 90 relative to the light bars 62, 72 defining the illuminated registration corner 60. Because the light pipe 80 relies on substantially total internal reflection to move the light to the first light bar 62, the bend in the angled portion 81 must not disturb the internal reflection.

When light passes from one medium to a second medium, it bends or refracts at the boundary surface due to change in velocity between the mediums. The change in velocity, and therefore refractive characteristics, are determined by examining the refractive indices of the mediums. At a certain angle of incidence—the angle between an incident ray and the normal to a reflecting or refracting surface—the light will stop crossing the boundary between mediums and instead travels along the boundary surface. This angle of incidence is called the critical angle $\theta_c$. As the angle of incidence increases past the critical angle $\theta_c$, the phenomenon of total internal reflection can be seen wherein light is reflected internally into the denser medium. The phenomenon only occurs when the light approaches a high refractive index to low refractive index boundary from the high refractive index side, not the other way around. For example total internal reflection will occur when passing from PMMA to air, but will not occur when passing from air to PMMA. The angle of incidence is expressed mathematically by:

$$\Theta_c = \arcsin\left(\frac{n_2}{n_1}\right)$$

where $\theta_c$ is the critical angle, $n_1$ is the refractive index of denser medium, for instance PMMA which is about 1.49, and $n_2$ is the refractive index for, for instance, air which is approximately 1. As previously indicated, when the angle of incidence is greater than the critical angle total internal reflection occurs. Returning to the present disclosure, when bending the light within the light pipe 80 the angle of incidence within the angled portion 81 must remain greater than the critical angle in order to maintain the total internal reflection and therefore pipe the light to the first light bar 62.

Adjacent the first light pipe 80, the second light pipe 82 extends from near the at least one LED 90. Unlike the first light pipe 80, the second light pipe 82 does not include any angled portions. Since the second light pipe 82 is aligned with the longitudinal axis of the second light bar 72, the second light pipe 82 does not need to bend the light emitted from the at least one LED 90 in order to direct the light along a longitudinal axis of the second light bar 72.

As previously indicated, the at least one LED 90 provides a light source for illuminating the first light bar 62 and second light bar 72. The at least one LED 90 is depicted positioned within an LED housing 91 in order to maintain position and alignment of the at least one LED 90. The at least one LED 90 is shown as two LEDs, a first LED corresponding to the first light pipe 80 and the first light bar 62 and a second LED corresponding to the second light pipe 82 and the second light bar 72. With two LEDs, by positioning them to be perpendicular to one another, the need to bend the light as previously described would not be needed. Also by using two LEDs the light bars 62, 72 can be individually illuminated. The at least one LED 90 is disposed a pre-selected distance from the first and second light pipes 80, 82 defining a gap 84 there between. The gap 84 is provided so that the at least one LED 90 does not contact the light pipes 80, 82 and become misaligned due to such harsh contact during manufacturing, shipping, or by during use by the end user. Further, the gap 84 is also maintained due to the manufacturing tolerances of the surrounding parts which may affect the at least one LED 90. While the gap 84 is depicted in the exemplary embodiment, other more costly manufacturing techniques or suspension devices can be utilized to inhibit such harsh contact between the first and second light pipes 80, 82 and the at least one LED 90 thus eliminating such misalignment from being an issue and eliminating or minimizing the gap 84.

Figure 4:
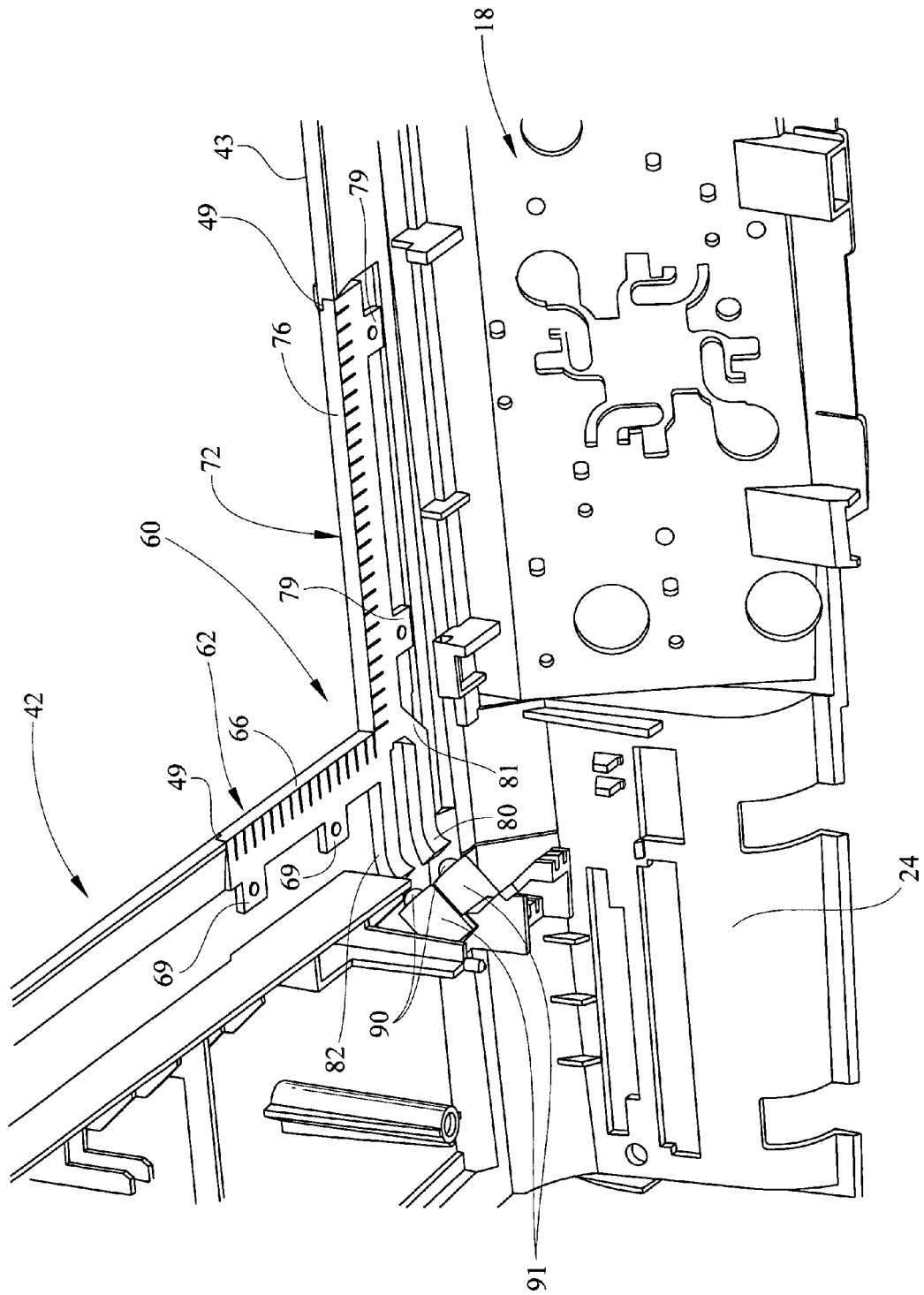
FIG. 4 is a bottom perspective view of the illuminated registration corner from the interior of the multi-function peripheral of FIG. 1.

Referring now to FIG. 4 which depicts a perspective view of the illuminated registration corner 60 from within the scanner top cover 42, the inner surface of the control panel 18 is shown as well as the inner surface of the media center 24. As previously indicated, the vertical surfaces 66, 76 comprise a height which is substantially equal to the height of the inner edge portion 43 of the scanner top cover 42. The inner edge portion 43 and registration corner 60 comprise a tongue 49 and recess connection which serves as a further alignment aid between the illuminated registration corner 60 and the inner edge portion 43 of the scanner top cover 42 so that the target media M (FIG. 2) which engages the illuminated registration corner 60 is aligned with the corner 60 and the platen 44 (FIG. 1). FIG. 4 further depicts the feet 79 receiving posts depending from the scanner top cover 42 to properly align the illuminated registration corner 60 within the corner of the scanner top cover 42. Accordingly, the tongue and recess 49 alignment in combination with the alignment channels 68, 78 (FIG. 3) and the feet 69, 79 provide proper alignment of the illuminated registration corner 60 within the corner of the scanner top cover 42. Otherwise stated, the alignment features immobilize the illuminated registration corner 60 in three dimensions.

FIG. 4 further depicts the positioning of the first and second light pipes 80, 82 and the at least one LED 90 within the scanner top cover 42. As shown, the at least one LED is aimed upwardly toward the first and second light pipes 80, 82. Both light pipes 80, 82 comprise a first angled section which is linearly aligned with the at least one LED 90. The light from the LED 90 is bent at a junction between the first portion of the light pipe 80, 82 and a second substantially linear portion of the first and second light pipes 80, 82. The second portion of the second light pipe 82 is aligned with the second light bar 72 of the illuminated registration corner 60. The first light pipe 80 however, is disposed at an angle that is substantially perpendicular to the first light bar 62. Accordingly, the angled portion 81 bends the light such that the light is directed through the longitudinal length of the first light bar 62.

Figure 5:
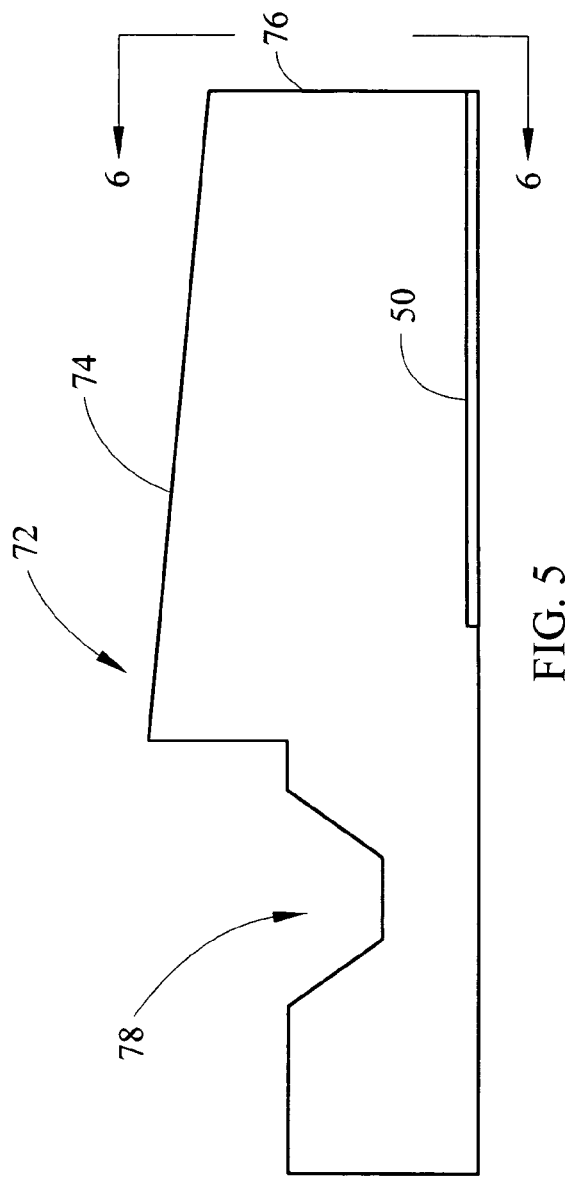
FIG. 5 is a cross-sectional view of one light bar of the illuminated registration corner.

Referring now to FIG. 5, a cross-sectional view of a representative second light bar 72 is shown without any cross-hatching for purpose of clarity. It should be understood that the view depicted in FIG. 5 can represent either the first light bar 62 or the second light bar 72. As depicted and previously indicated, the second light bar 72 comprises a substantially vertical surface 76 having a height which is substantially equal to the inner edge portion 43 (FIG. 4) of the scanner top cover 42 (FIG. 4). The upper surface 74 is slightly tapered in order to match the taper of the upper surface adjacent the inner edge portion 43 (FIG. 4) of the scanner top cover 42. Thus, the vertical surface 76 and tapered surface 74 provide an aesthetically pleasing surface fit and finish for the illuminated registration corner 60 which matches the adjacent inner edge portions 43 of the scanner top cover 42. Extending from a rear portion of the exemplary second light bar 72 is a channel 78 having a substantially frusto-conical section therein. However, alternative shapes can be utilized so long as the alternative shapes are matched by ribs having complementary shapes wherein the channels 78 can receive the corresponding shaped ribs depending from a lower surface of the scanner top cover 42. Further, the channel 78 alternatively can be disposed on a lower surface of the scanner top cover 42 and a complementary rib can be extended from the rear portion of the first and second light bars 62, 72 so that proper alignment is maintained between the scanner cover 42 and the illuminated registration corner 60.

Still referring to FIG. 5, one of a plurality of spaced apart facets 50 is shown along the lower surface of the second light bar 72 adjacent the vertical surface 76. The facets 50 provide reflective surfaces to interrupt the light path within the light bars 62, 72 directing light upwardly and making it visible from above. Since the light bars 62, 72 utilize internal reflection to convey light, the light must be interrupted in order to be visible to a user. The facets 50 perform this function.

Figure 6:
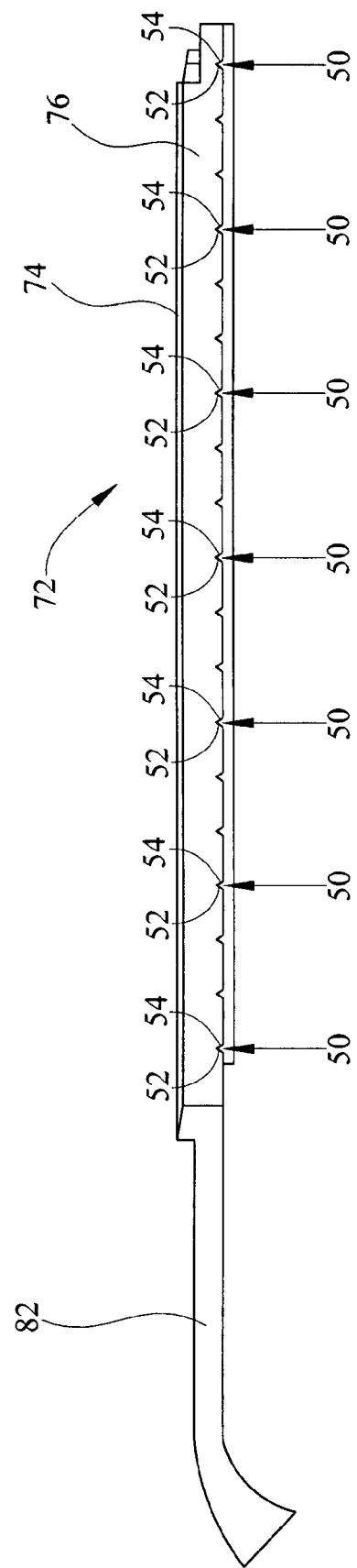
FIG. 6 is a front view of the light bar of FIG. 5 taken along line 6-6 of FIG. 5 in a normal direction to FIG. 5; and, FIG. 7 is a flow chart depicting operation of the illuminated registration corner of FIG. 1.

Referring now to FIG. 6, a front view of the second light bar 72 is depicted along line 6-6 in FIG. 5 through a direction substantially perpendicular to the view shown in FIG. 5. As previously indicated, it should be understood that the view of FIG. 6 may represent either the first leg 62 or the second leg 72. The light bar 72 comprises a plurality of facets 50 extending in a direction normal to the longitudinal length of the light bar 72. As shown, the facets are equally spaced apart along the length of light bar 72 although other spacing can be used. Since the light from the at least one LED 90 travels through the light bar 72 in the longitudinal direction, the light encounters the facets 50 which extend in a substantially perpendicular direction to the travel of light through the light bar 72. The facets 50 comprise a substantially triangular shape including a first angled surface 52 and a second angled surface 54 extending from a lowermost surface of the first light bar 72. The facets 50 are formed in the PMMA as previously described and are polished to a highly reflective finish. These surfaces interrupt light and direct the light upward rendering it visible to a user.

Figure 7:
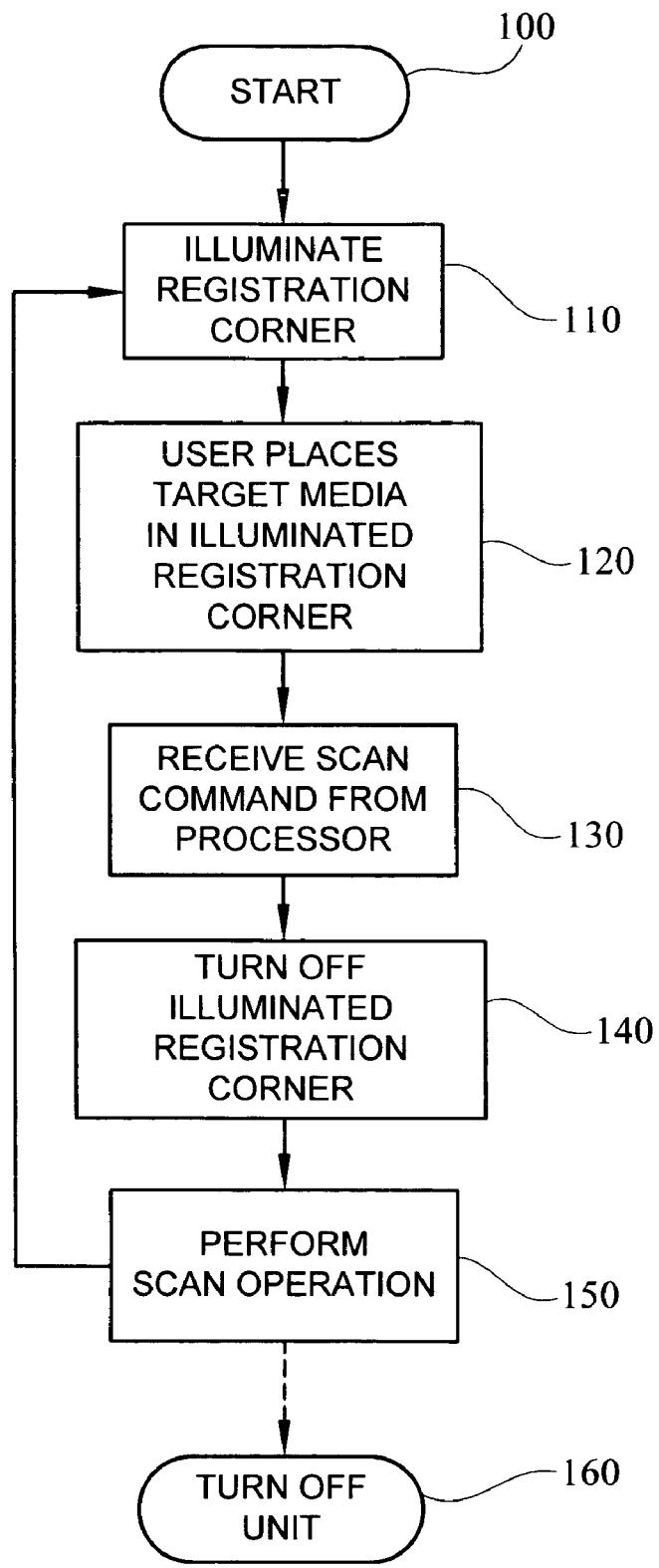

Referring now to FIG. 7, a flow chart depicts operation of the illuminated registration corner 60. According to one embodiment, the illuminated registration corner 60 is illuminated whenever the device 10 is on and only deactivates for scanning operations. In use, the operation of the illuminated registration corner is relatively simple. The stand alone flatbed scanner or multi-function peripheral 10 is started at 100 by powering on the peripheral 10. After going through a warm-up cycle, if necessary, the illuminated registration corner 60 is activated or illuminated at 110 and remains illuminated until a scanning operation begins. After a user places target media at the illuminated registration corner at 120 in the correct orientation and inputs a scanning command, the scanner 40 receives a scanning command from a processor at 130. After the scanning command is received at 130, the processor deactivates the illuminated registration corner 60 at 140 a predetermined period of time before the scanning operation started. Typically this period is between immediately prior to up to a few seconds prior to the start of the scanning operation. Deactivating the illuminated registration corner 60 is necessary to inhibit interference from the illuminated registration corner 60 which could degrade scan quality. After the illuminated registration corner 60 is deactivated, the scanning operation occurs at 150. Finally, either of two steps occur. In most cases, the registration corner 60 is illuminated again at 110 to await a further scanning command. However, in an alternative step, the user can choose to turn off the processor at 160.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An illuminated media position indicator for an imaging device, comprising:
    a scanner comprising:
        a scanner top cover comprising an inner edge portion defining an opening;
        a scanning platen adjacent said opening;
        said inner edge portion having at least one corner corresponding to a scan origin;
    an illuminated registration corner, said illuminated registration corner positioned in said at least one corner corresponding to said scan origin; and
    at least one LED in optical communication with said illuminated registration corner;
    said illuminated registration corner communicating light from said at least one LED throughout said illuminated registration corner using internal reflection to indicate media position and orientation at said scan origin.

2. The media position indicator of claim 1, wherein said illuminated registration corner further comprises a first light bar and a second light bar.

3. The media position indicator of claim 2 further comprising said first and second light bars positioned in a substantially L-shaped arrangement wherein one of said first light bar and said second light bar is shorter than the other of said first light bar and said second light bar.

4. The media position indicator of claim 1 wherein said illuminated registration corner partially defines an inner edge portion of said scanner top cover.

5. The media position indicator of claim 1, further comprising at least one light pipe in optical communication with said at least one LED and said illuminated registration corner.

6. The media position indicator of claim 4, wherein said at least one LED is deactivated during a scanning operation.

7. The media position indicator of claim 1, further comprising a first light pipe and a second light pipe utilizing substantially total internal reflection to pipe light from said at least one LED to said illuminated registration corner.

8. The media position indicator of claim 1, further comprising a plurality of spaced apart prismatic surfaces extending from a lower surface of said illuminated registration corner.

9. The media position indicator of claim 6, said plurality of prismatic surfaces interrupting a light path within said illuminated registration corner and directing a portion of said light path upward through said illuminated registration corner.

10. The illuminated registration corner of claim 1, said scanner further comprising a scanner lid sized to cover said opening.

11. An illuminated registration corner, comprising:
    a first light bar; and
    a second light bar substantially orthogonally positioned with respect to said first light bar with one of said first light bar, said second light bar in optical communication with at least one light emitting diode and being disposed adjacent a scan origin on a flatbed scanner to indicate media position and orientation at said scan origin.

12. The illuminated registration corner of claim 11 further comprising a first light pipe in optical communication between said at least one light emitting diode and said first light bar.

13. The illuminated registration corner of claim 11 further comprising a second light pipe in optical communication between said at least one light emitting diode and said second light bar.

14. The illuminated registration corner of claim 11, said first and second light pipes comprising total internal reflection to pipe light from said at least one LED to said first and second light bars.

15. The illuminated registration corner of claim 11 wherein said at least one light emitting diode comprises a first light emitting diode and a second light emitting diode.

16. The illuminated registration corner of claim 11 said first light bar and said second light bar formed of polymethyl methacrylate.

17. The illuminated registration corner of claim 11 further comprising a plurality of spaced apart facets within said first and second light bars to direct light upwardly through upper surfaces of said first and second light bars.

18. The illuminated registration corner of claim 17, wherein said facets interrupt a light path extending through said first and second light bars and directing light upward through said first and second light bars.

19. The illuminated registration corner of claim 17 wherein said facets have a mirror finish.

20. The illuminated registration corner of claim 11 wherein one of said first and second light bars is shorter than the other of said first and second light bars.

21. A media position indicator, comprising:
    a flatbed scanner comprising a platen and a scanner top cover adjacent said platen; and
    an illuminated registration corner aligned with an inner portion of said scanner top cover and adjacent said platen at a scan origin, indicating said scan origin and an orientation for a target media, and in optical communication with at least one light pipe and at least one light emitting diode.

22. The media position indicator of claim 21 further comprising a plurality of spaced apart facets within said illuminated registration corner to interrupt light path therein and render said light path visible to a user.

23. The media position indicator of claim 21 wherein said illuminated registration corner further comprises a first light bar and a second light bar positioned substantially orthogonal to one another wherein light from said at least one light emitting diode is directed longitudinally through light bars defining said illuminated registration corner.

24. A method of using an illuminated registration corner, comprising the steps of:
   illuminating a registration corner during start-up of a peripheral device comprising a flatbed scanner;
   deactivating said illuminated registration corner a predetermined period of time before a scanning operation starts; and reactivating said illuminated registration corner when said scanning operation is finished.

25. The method of claim 24 further comprising the step of activating and deactivating said illuminated registration corner with a processor.

26. The method of claim 24 further comprising the step of piping light from a light emitting diode through said illuminated registration corner.

27. The method of claim 24 further comprising the step of bending light from a light emitting diode into longitudinal alignment with at least one light bar.

28. The method of claim 24 further comprising the step of utilizing total internal reflection to pipe light from a light emitting diode to said illuminated registration corner.

29. A media position indicator, comprising:
   an illuminated registration corner directing light upwardly from adjacent a registration corner of a flatbed scanner for indicating to a user both location and orientation for target media on said flatbed scanner; and
   a light pipe for transferring light to said illuminated registration corner using total internal reflection from at least one light emitting diode.

* * * * *